Inventor
S. J. Burwell
By Gareth C. Maybee
Attorney

June 17, 1952  S. J. BURWELL  2,601,090
HELICOPTER CONTROL
Filed July 20, 1945  3 Sheets-Sheet 2
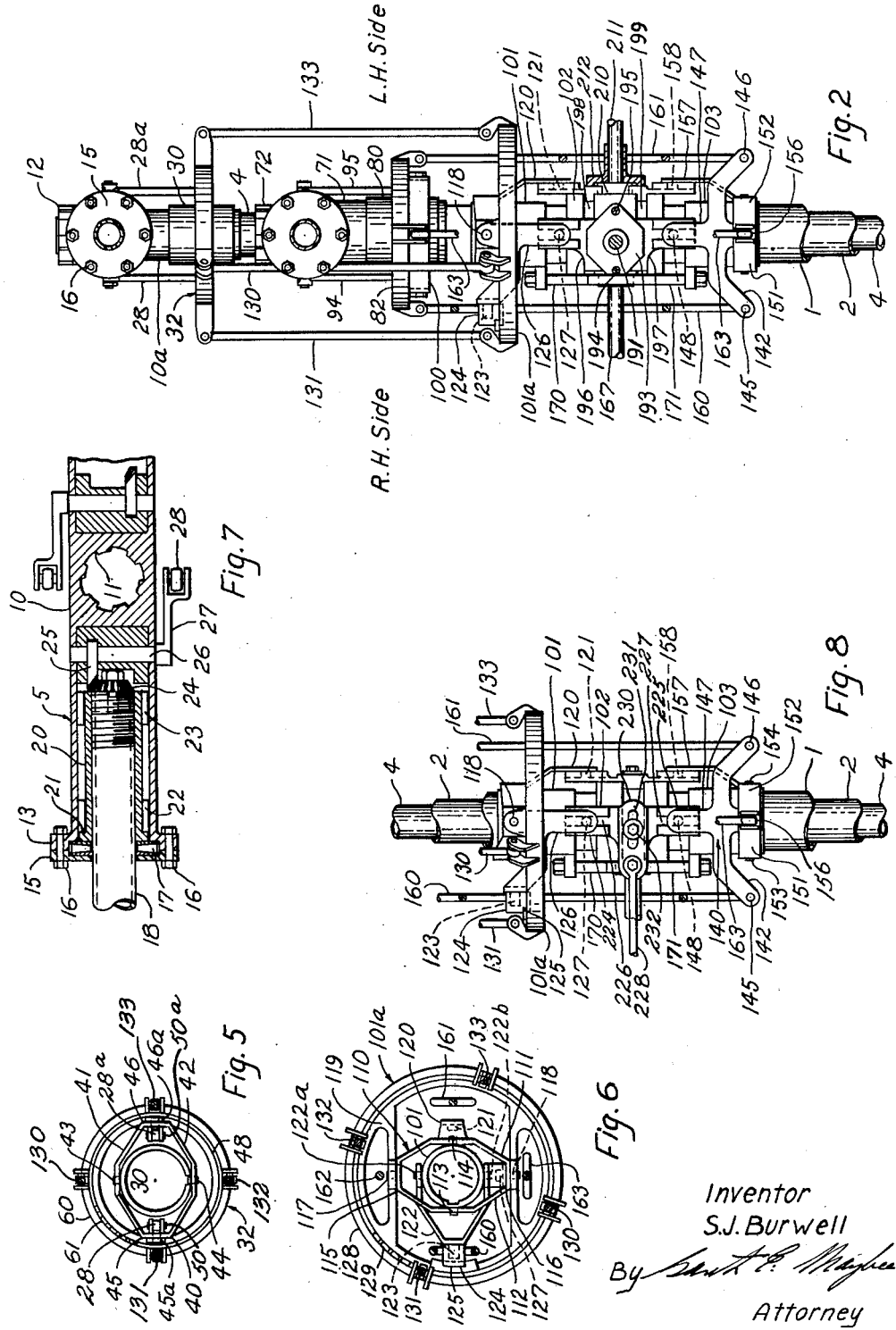
Inventor
S.J. Burwell
By
Attorney June 17, 1952   S. J. BURWELL   2,601,090
HELICOPTER CONTROL
Filed July 20, 1945   3 Sheets-Sheet 3
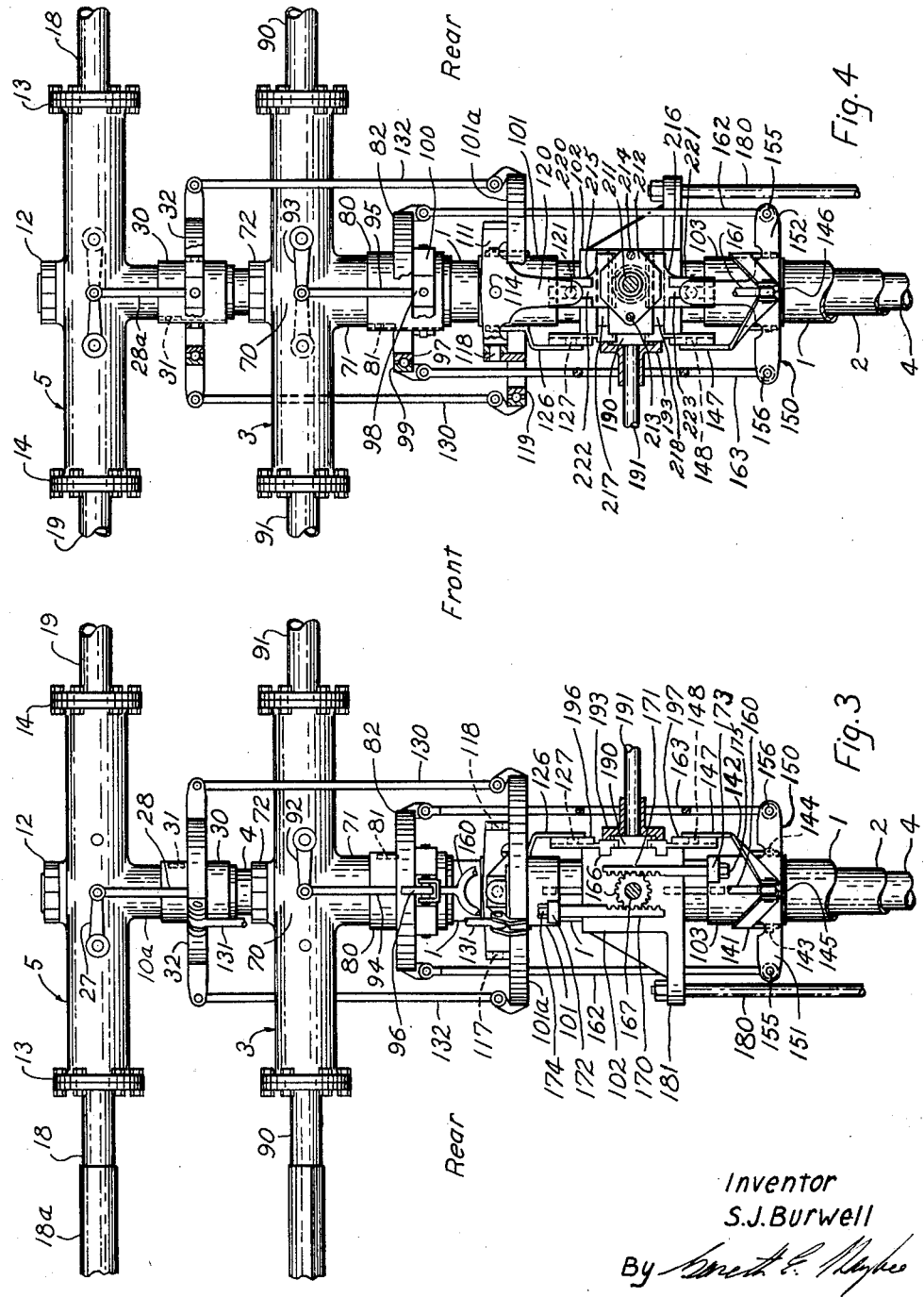
Inventor
S. J. Burwell
By
Attorney Patented June 17, 1952

2,601,090

UNITED STATES PATENT OFFICE 2,601,090

HELICOPTER CONTROL

Stanley James Burwell, Toronto, Ontario, Canada

Application July 20, 1945, Serial No. 606,128

18 Claims. (Cl. 170—135.24)

This invention relates to improvements in aircraft and has particular reference to improvements in direct-lift type of aircraft commonly referred to as helicopters.

It is an object of this invention to provide a helicopter in which the driving, lifting and steering is controlled solely by means of two sets of propeller units revolving in parallel horizontal planes and in opposite directions on co-axial shafts. These units each comprise two or more radially disposed pivoted blades, and swash plate means operatively connected to the blades are provided for varying their pitch or angle of incidence while they revolve in order that the lifting force exerted by them may be increased or decreased at will. The same propeller units are also adapted to impart a translation driving force in any desired direction to the helicopter. The abovementioned swash plates also cause the blades to cyclically oscillate about their own axis as they revolve.

Translation is caused by the difference in induced drag between forwardly moving airfoils and rearwardly moving airfoils. As the two propeller units revolve in opposite directions, and since the cyclic variation of the angle of inclination of the blades of one propeller unit is always diametrically opposite to that of the blades of the other unit, it will be seen by those skilled in the art how a motion of translation is imparted to the helicopter of which the propeller units are a part. Also, the swash plates can differentially vary the pitch of the blades of the two propeller units, thereby providing for directional control of the apparatus.

It is a further object of this invention to provide control means for helicopters operated by dual co-axially mounted propellers that are simple in construction, relatively smooth and quiet in operation, as free from friction as reasonably possible, and relatively inexpensive to manufacture.

Another object of this invention is to provide control means of this type which are very light in weight, this being a highly desired feature in any type of aircraft.

Therefore, to summarize, this invention consists essentially in combining in one single control device the three following actions which may be exercised on both propeller units or sustaining helices separately or simultaneously at the will of the operator.

1. The general simultaneous variation of the angle of incidence of all the helices, for causing the aircraft to ascend, descend, and/or remain without movement in a fixed point of space, that is, hover.

2. The differential variation of the angle of incidence of the helices turning in opposite directions, which creates a disparity of the resisting couples of these helices, a disparity which, transmitted to the nacelle or body which they support, causes it to turn around the axis of gyration of the said helices, thus producing directional control of the aircraft.

3. The periodic variation of the angle of incidence of the sustaining helices, otherwise known as cyclic pitch control, to create in any plane passing through the axis of gyration of the said helices a couple serving to effect the translation of the apparatus in any desired horizontal direction.

Other objects and advantages will be more particularly seen hereinafter and will become apparent as the description proceeds.

In the accompanying drawings in which like reference characters are used to designate similar parts throughout there is illustrated by way of example, a suitable mechanical embodiment for the purpose of disclosing the invention. The drawings, however, are for the purpose of illustration only and are not to be taken as limiting the invention as it will be apparent to those skilled in the art that various changes in the illustrated construction may be resorted to without in any way exceeding the scope of the invention.

In the drawings and specification reference to right, left, front and rear are always from the point of view of the operator of the helicopter.

Figure 2 is a front elevation of said propeller control means showing particularly the mechanism whereby sideways translation is controlled;

Figure 3 is a right side elevation of said propeller control means showing particularly the mechanism whereby the torque reaction of the rotors is differentially varied in order to steer the aircraft;

Figure 4 is a left side elevation of said propeller control means showing particularly the mechanism whereby forward and backward translation is controlled;

Figure 5 is a bottom view of a rotor gimbal-mounted swash plate;

Figure 6 is a top plan view of the column gimbal-mounted swash plate;

Figure 7 is a cross-sectional view through the upper rotor, looking downwards; and Figure 8 is an elevation of a modified construction of the mechanism whereby translation is controlled.

Figure 1:
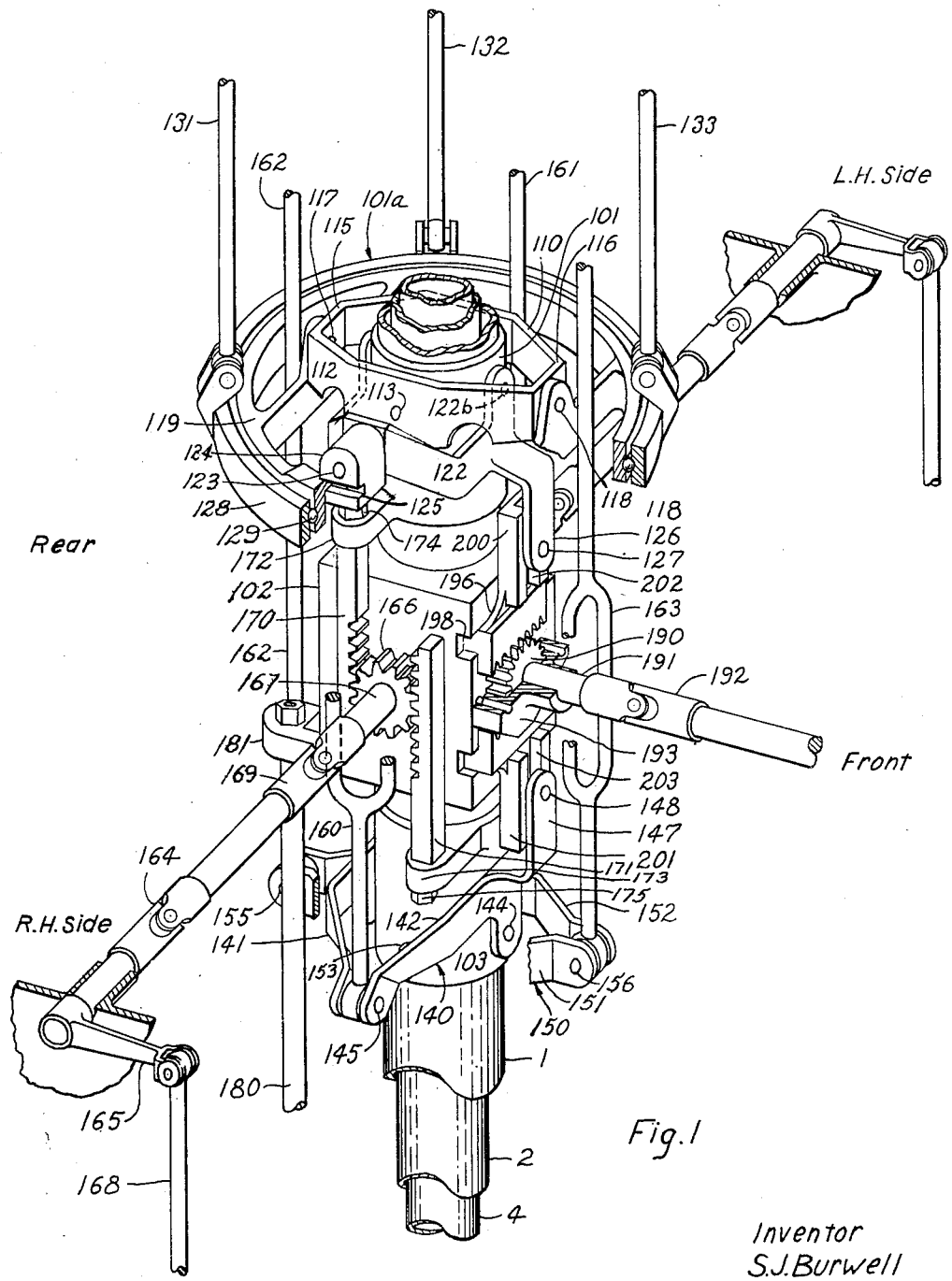
Figure 1 is a perspective view of the propeller control means for a helicopter constructed according to the invention.

Referring now to Figure 1 in which for the sake of clarity certain parts have been omitted, reference character 1 indicates a column which is fixedly attached to the body of the machine, not shown. Rotatably mounted inside this column is a hollow shaft 2 which supports the lower rotor 3, said hollow shaft projecting through and above the top of the column 1. Rotatably mounted inside the hollow shaft 2 is a shaft 4 which supports the upper rotor 5 and projects through and above the top of the hollow shaft 2.

The power plant which is preferably an internal combustion engine, is in the body of the aircraft, and suitable means well known in the art are provided to connect the power plant to both the shaft 4 and the hollow shaft 2 and to drive them in opposite directions, thereby rotating the two rotors in opposite directions.

The upper rotor 5 and lower rotor 3 are of like construction and therefore only one, say the upper, will be described. Referring particularly to Figure 7, the upper rotor 5 comprises a central hub 10 through the center of which the shaft 4 extends transversely and is rigidly connected thereto by means of splines 11 and nut 12. Both extremities of the hub 10 are provided with flanged portions 13 and 14.

Extending radially from each end of the hub 10 are spars 18 and 19 which are rotatably mounted therein. Since the construction of each rotor is symmetrical about its vertical axis of rotation, only one side need be described.

A thrust collar 15 is rigidly secured to flange portion 13 by means of nut and bolt assemblies 16. A tapered roller thrust bearing 17 bears against collar 15.

A circular sleeve 20 having a flange 21 is screwed on the spar 18 and these form a rigid unit. The flange 21 bears against thrust bearing 17 and thereby holds the spar inside the hub 10. Suitable needle bearings 22 and 23 are provided to permit the spar 18 to rotate inside the hub 10.

Rigidly mounted on the inner extremity of the spar 18 is a bevel gear 24 which engages bevel quadrant 25 at right angles to it; quadrant 25 is keyed to a small shaft 26 which is journalled transversely to and inside the hub. Keyed to the other extremity of this shaft and at right angles to it is an actuating lever 27 to which is pivotally connected a link 28. It is obvious that if this link 28 be moved up and down, an oscillatory motion about a horizontal axis will be imparted to the spar 18.

To the outer extremity of spar 18 is rigidly attached a suitable airfoil 18a forming one of the blades of the rotor. Thus by moving the link 28, the angle of incidence of this airfoil or blade may be varied at will.

Immediately below rotor 5 is a sliding sleeve 30 mounted on a downwardly extending portion 10a of hub 10. A key 31 prevents the sliding sleeve from rotating with respect to the hub, but allows it to move longitudinally thereon.

On this sleeve 30 is a gimbal-mounted swash plate 32, the construction of which is better illustrated in Figure 5. It comprises a beam member 40 having two side portions 41 and 42, each side portion being journalled at its center to opposite sides of the sleeve 30 by means of pins 43 and 44. Each pair of side portions are joined together at their extremities 45 and 46, and bearings 45a and 46a are provided therein to journal the inner ring 48 of the swash plate thereto. Pins 43 and 44 and bearings 45a and 46a are in the same plane but their axes are spaced radially by 90°. Thus by means of this gimbal mounting the swash plate 32 can be universally inclined to any desired angle.

Link 28 is pivotally connected at 50 to one end of beam member 40 whereas link 28a is similarly attached at 50a to the opposite end of said beam member 40.

The inner ring 48 is rotatably mounted inside an outer ring 60, suitable balls or rollers 61 being provided to reduce the friction between the two rings.

The lower rotor 3 (which is identical in construction to the upper rotor 5) comprises a hub 70 having at its center a downwardly extending portion 71 through which is splined the hollow shaft 2, and a ring nut 72 provides greater security to the connection.

Immediately below the lower rotor 3 is a sliding sleeve 80, a key 81 preventing it from rotating with respect to the hub but allowing it to move longitudinally thereon.

On this sleeve 80 is a gimbal-mounted swash plate 82, comprising inner ring 97 pivoted on beam member 100 and outer ring 99, which is of identical construction but of different size than gimbal-mounted swash plate 32. Spars 90 and 91 of the lower rotor are actuated in the same way as the spars of the upper rotor by means of actuating levers 92 and 93 and links 94 and 95. Link 94 is pivotally connected at 96 to one end of the beam member 100 of swash plate 82, whereas link 95 is similarly attached at 98 to the opposite end of said beam member 100.

Mounted around column 1 are three sliding sleeves 101, 102 and 103 which are keyed to the column so as to prevent rotation but which may be moved longitudinally with respect to it.

On the sleeve 101 is a gimbal-mounted swash plate 101a, the construction of which is better shown in Figure 6. It comprises a beam member 110 having two side portions 111 and 112, each side portion being pivotally mounted at its center to opposite sides of the sleeve 101 by means of pivots 113 and 114. The extremities 115 and 116 of each pair of side portions are joined together, and bearings 117 and 118 are provided therein to pivotally mount the inner ring 119 of the swash plate thereto. Extending downwardly from side portion 111 of the beam member is a moment arm 120 having a pin 121 at its lower end. Thus, if this arm 120 is swung back and forth, the swash plate 101a will be forced to oscillate about its pivots 113 and 114 on the sleeve.

A forked transverse member 122 at right angles to the beam member 110 and having bearings 122a and 122b at each extremity is journalled thereby to opposite sides of sleeve 101.

At the center of the forked transverse member 122 is a pin 123 which fits in bearing block 124. Bearing block 124 is slideably connected to the inner ring 119 of the swash plate by means of the tongue and groove arrangement as shown at 125. One extremity of forked transverse member 122 has a moment arm 126, and a pin 127 is provided at the end thereof. Therefore by pushing back and forth on arm 126, the swash plate 101a will be forced to oscillate about its bearings 117 and 118. It may thus be seen that this swash plate has universal motion and may be tilted to any angle in any plane by pushing sideways against either or both of pins 121 and 127. Surrounding the inner ring 119 is an outer ring 128 rotatable about it on balls or rollers 129.

Four rods 130, 131, 132 and 133 of equal length and radially spaced apart by 90° connect the outer ring 60 of swash plate 32 to the outer ring 128 of swash plate 101ᵃ; the connections between the rods and the rings are universal joints, preferably of the ball and socket type. These four rods naturally must rotate with rotor 3 and suitable means are provided to attach them to the rotor while still allowing them to move up and down. Since the two swash plates 32 and 101ᵃ are so connected by the abovementioned rods then if swash plate 101ᵃ is tilted about any axis an identical tilt or inclination will be imparted to the swash plate 32, the inner ring 48 of which is rotating with the upper rotor.

On sleeve 103 is mounted a beam member 140 comprising two rockers 141 and 142 pivoted at their center on pins 143 and 144 which are on opposite sides of sleeve 103. The extremities of each rocker slope downwardly and each pair is joined by bearings 145 and 146. Rocker 142 has an upwardly extending moment arm 147, with a pin 148 near the end thereof, the purpose of which will appear later.

A second beam member 150, comprising two rockers 151 and 152, is mounted on sleeve 103 in a position radially spaced apart by 90° from beam member 140. Each rocker is pivoted at its center on pins 153 and 154 which are on opposite sides of sleeve 103. The extremities of each pair of arms are joined by bearings 155 and 156. Arm 152 has an upwardly extending moment arm 157 with a pin 158 near the end thereof, the purpose of which will appear later.

Four rods 160, 161, 162 and 163 of equal length radially spaced apart by 90° connect the outer ring of swash plate 82 to bearings 145, 146, 155 and 156 respectively of the two beam members 140 and 150. For constructional reasons as will be apparent from Figure 1, rods 160, 161 and 163 have a looped portion near their centre; a loop is obviously not required in rod 162.

Since the rods are of equal length, and since the beam members 140 and 150 are so constructed that when they are in a level position the bearings 145, 146, 155 and 156 are at exactly the same elevation, any inclination or tilt of the beam members will impart to swash plate 82 a corresponding inclination.

The middle sliding sleeve 102 is in the form of a rectangular block and consequently has four faces.

Referring to Figure 1 which is a perspective view and to Figure 3 which is a right hand side elevation of the controls, it is seen that against a face of sleeve 102 is a pinion 166 rigidly mounted to a shaft 167 which is journalled in the body of sleeve 102, this shaft being connected to the aircraft operator's controls 168 by means of universal joints 169 and 164, and crank 165. Racks 170 and 171 which are respectively attached to brackets 172 and 173 of sliding sleeves 101 and 103 by means of nuts 174 and 175 are in engagement with pinion 166. Assuming that the pinion is prevented from rotating, then its engagement with racks 170 and 171 will hold the sleeves 101 and 103 in a fixed position with respect to the sleeve 102. On the other hand if the pinion 166 is rotated, say counter-clockwise, sleeve 103 will move downwards while sleeve 101 will move upwardly with respect to sleeve 102 by a corresponding distance.

Referring now to Figure 1, rod 180 which is connected by suitable linkages to the operator's controls is rigidly fixed to the bracket 181 extending from sleeve 102 and therefore an upward or downward movement of said rod 180 will move sleeve 102 along the column, and consequently will also move with it sleeves 101 and 103 and swash plate 101ᵃ, and beam member 140 and 150. But swash plate 101ᵃ and the arrangement of beam members 140 and 150 are respectively connected by means of rods as previously described to the rotor swash plates 32 and 82. Consequently an upward or downward movement of rod 180 will move all the sleeves and all the swash plates upwardly or downwardly by a corresponding distance; in other words, the vertical position of the whole operative assembly will be changed.

Referring now to Figure 1, and also to Figure 2 which is a front elevation, pinion 190 is keyed on shaft 191, which is similar to shaft 167, and is provided with suitable universal joints 192. The rotation of this shaft is controlled by the operator of the aircraft. The end of shaft 191 is journalled in the body of sleeve 102, and the pinion is retained by a suitable cover 193 which is held by screws 194 and 195. Similar racks 196 and 197 which slide in guides 198 and 199 of sleeve 102 are in engagement with pinion 190. On each rack are the vertically extending portions 200 and 201 having therein guides 202 and 203 which engage respectively with pins 127 and 148 of extensions 126 and 147.

Thus, if pinion 190 is rotated, say clockwise as the observer looks from the rear to the front of the aircraft, rack 196 will move towards the right by a certain distance while rack 197 will move to the left by a corresponding distance. This movement of the racks will be communicated to arms 126 and 147 through pins 127 and 148 and will cause swash plate 101ᵃ and beam member 140 to tilt correspondingly. Therefore on clockwise rotation of the pinion, swash plate 101ᵃ will be inclined downwardly to the left and simultaneously beam member 140 will be inclined by the same angle downwardly to the left. This inclination of the swash plate 101ᵃ and of beam member 140 will be communicated as above described by the respective rods to the rotor swash plates 32 and 82.

Referring now to Figure 4 which is a left side elevation of the controls, a rack and pinion arrangement identical to that on the front elevation is seen. It comprises a pinion 210 which is keyed on shaft 211. This shaft is similar to shaft 167 and its rotation is controlled by the operator of the aircraft. The end of shaft 211 is journalled in the body of sleeve 102 and the pinion is retained by a suitable cover 212 which is held by screws 213 and 214. Identical racks 215 and 216 which slide in guides 217 and 218 of sleeve 102 are in engagement with pinion 210. On each rack are the vertically extending portions 220 and 221 having therein guides 222 and 223 which engage respectively with pins 121 and 158 of arms 120 and 157.

The operation of this rack and pinion is identical to that described in the previous paragraph, except that it varies the inclination of the rotor swash plates along an axis radially distanced by 90° to that described in the preceding paragraph.

Operation

For the sake of simplicity the action of only one blade of the upper rotor 5 will first be considered. If swash plate 32, and consequently sleeve 30, is pushed upwardly this will move link 28 and in turn rotate actuating lever 27 causing the pitch of the airfoil on spar 18 to increase. On the other hand if swash plate 32 is inclined to any desired angle, and its outer ring 60 is prevented from rotating (assuming that the rest of the mechanism is partially disassembled for demonstration purposes) then as the rotor 5 rotates the link 28 will cyclically oscillate up and down as determined by the radial position of the inner ring with respect to the outer ring, and the pitch of the blade will cyclically vary.

Now considering the machine as an operative unit, if rod 180 is pushed upwardly, all the sleeves and all the swash plates will correspondingly move upwardly and therefore the pitch of all the blades will simultaneously increase. Similarly if rod 180 is pulled downwardly the pitch of all the blades will correspondingly decrease. This simultaneous variation of the pitch of all the blades is used to control ascent or descent of the helicopter.

Steering is accomplished by increasing the pitch of the blades of one rotor and hence increasing its torque reaction while at the same time decreasing the pitch of the blades and the torque reaction of the other rotor; the body of the machine will therefore swing around in a direction opposite to the rotation of the most effective rotor. This change is accomplished by the racks 170 and 171 and pinion 166 shown in the right hand side elevation Figure 3. As the pinion is rotated by the operator, say clockwise, as seen in the drawings, the rack 171 will move downwardly thereby moving downwards sleeve 103, which communicates this motion to and moves downwardly the lower rotor swash plate 82. Simultaneously rack 170 will move upwardly thereby moving upwards sleeve 101, which communicates this motion to and moves upwardly the lower rotor swash plate 82 by a corresponding distance. Thus, the pitch of the blades of the upper rotor is increased whereas that of the blades of the lower rotor is decreased, and the machine will swing in a direction opposite to that of the rotation of the upper rotor.

Translation is achieved by cyclic pitch control of all the rotor blades, that is, by a cyclic variation of the pitch of the blades as the rotors sweep through the arc of a circle. Considering Figure 4, the left hand side elevation, if the swash plates are tilted by means of racks 215 and 216 and pinion 210 downwardly towards the front, the helicopter will translate in the same direction as the downward tilt of the ring due to this cyclic pitch control, that is, move forwardly as will be obvious to those skilled in the art.

Considering Figure 2, the front elevation, if the swash plates are tilted towards the right of the aircraft, by means of racks 196 and 197 and pinion 190, the aircraft will translate sideways towards the right for the same reason as described in the previous paragraph.

Similarly by tilting the swash plates in any other direction the aircraft will translate in the direction of tilt.

Thus in these controls, lift is achieved by moving all the controls longitudinally along the shaft; steering is accomplished by differentially spacing the two groups of swash plates; and translation in any direction is obtained by tilting the swash plates to an angle in the desired direction.

It should be emphasized that by these controls, all the operations for steering, lifting and translating in any direction can be combined and performed simultaneously, without one operation affecting any of the others mechanically.

Figure 8 which is a front elevation shows a slightly modified translation control mechanism. Actually the view shown in Figure 8 illustrates the mechanism for sideways translation and corresponds to Figure 2, but obviously this modified mechanism can also be used for forward and backward translation. The parts illustrated and the numbering correspond to those in the other figures except as hereinafter specified.

Instead of using a rack and pinion device to move arms 126 and 147, a sliding crosshead 230 having an elongated aperture 231 is used. The sliding crosshead travels in guides and is retained against sleeve 102 by means of the bolt and washer assembly 232 which fits in aperture 231. Extending from the crosshead 230 are vertically disposed members 224 and 225 which have guides 226 and 227 into which fit the pins 127 and 148. A rod 228 is pivotally connected to the crosshead 230, and by well known linkages, this rod is operated by the pilot's controls.

If rod 228 is pulled, it is obvious that arms 126 and 147 will force swash plate 101ᵃ and beam member 140 to tilt. It should be noted, however, that the swash plate and beam member instead of tilting in parallel planes as in the preferred type of construction, tilt in opposite directions. This reversed effect is simple to counteract by merely reversing one of the quadrant gear arrangements in the hub (Figure 7).

Having thus described the invention it is thought that its construction and use will be apparent from the above description of the various parts and their purpose. It is to be understood that the form of the invention herewith shown and described, is to be taken as a preferred example of the same, and that various changes in the shape, size and arrangement of parts may be resorted to, without departing from the spirit of the invention, or the scope of the claims.

What I claim as my invention is:

1. In propelling apparatus for aircraft a pair of horizontally disposed rotors mounted one above the other, each comprising a plurality of radially disposed blades; co-axial shafts on which the rotors are respectively mounted; said rotors having a transverse hub at the centre thereof and being adapted to be revolved in opposite directions on the co-axial shafts for imparting movement to the aircraft; a fixed column; said co-axial shafts rotating inside the fixed column; a swash plate mounted universally on the hub of each rotor, said swash plates having inner and outer portions rotatable with respect to each other, the inner portion rotating with its rotor; links mounted on opposite sides of each rotor swash plate inner portion and operatively connected to the respective rotor blades; and means mounted on the fixed column and connected to the outer portions of the swash plates to control the inclination and elevation of each swash plate.

2. Apparatus as claimed in claim 1, in which the upper rotor swash plate control means comprises a swash plate universally mounted on the fixed column; said column swash plate having an inner non-rotatable portion and an outer portion rotatable with respect to the inner portion, the outer portion being connected to the outer portion of the upper rotor swash plate by means of pivotally mounted parallel linkages rotatable with the lower rotor.

3. Apparatus as claimed in claim 1, in which the lower rotor swash plate control means is universally mounted on the fixed column, said means being connected to the outer portion of the lower rotor swash plate by means of pivotally mounted parallel linkages.

4. Apparatus as claimed in claim 1, in which the upper rotor swash plate control means comprises a swash plate universally mounted on the fixed column; said column swash plate having an inner non-rotatable portion and an outer portion rotatable with respect to the inner portion, the outer portion being connected to the outer portion of the upper rotor swash plate by means of pivotally mounted parallel linkages rotatable with the lower rotor; and in which the lower rotor swash plate control means is universally mounted on the fixed column, said means being connected to the outer portion of the lower rotor swash plate by means of pivotally mounted parallel linkages.

5. Apparatus as claimed in claim 1, in which the upper rotor swash plate control means comprises a swash plate universally mounted on the fixed column; said column swash plate having an inner non-rotatable portion and an outer portion rotatable with respect to the inner portion, the outer portion being connected to the outer portion of the upper rotor swash plate by means of pivotally mounted parallel linkages rotatable with the lower rotor; and in which the lower rotor swash plate control means is universally mounted on the fixed column, said means being connected to the outer portion of the lower rotor swash plate by means of pivotally mounted parallel linkages passing through the inner portion of the column swash plate.

6. Apparatus as claimed in claim 1, in which the upper rotor swash plate control means comprises a swash plate universally mounted on the fixed column; said column swash plate having an inner non-rotatable portion and an outer portion rotatable with respect to the inner portion, the outer portion being connected to the outer portion of the upper rotor swash plate by means of pivotally mounted parallel linkages rotatable with the lower rotor; the lower rotor swash plate control means being universally mounted on the fixed column, said means being connected to the outer portion of the lower rotor swash plate by means of pivotally mounted parallel linkages passing through the inner portion of the column swash plate; a sleeve slidably mounted on the column between the column swash plate and the universally mounted lower rotor swash plate control means; and means to vary the relative positions of the column swash plate, the universally mounted lower rotor swash plate control means and the sleeve and to hold same in any desired relative position.

7. Apparatus as claimed in claim 1, in which the upper rotor swash plate control means comprises a swash plate universally mounted on the fixed column; said column swash plate having an inner non-rotatable portion and an outer portion rotatable with respect to the inner portion, the outer portion being connected to the outer portion of the upper rotor swash plate by means of pivotally mounted parallel linkages rotatable with the lower rotor; the lower rotor swash plate control means being universally mounted on the fixed column, said means being connected to the outer portion of the lower rotor swash plate by means of pivotally mounted parallel linkages passing through the inner portion of the column swash plate; a sleeve slidably mounted on the column; a pinion mounted on said sleeve and rotatable by the operator; and racks moved by said pinion and connected respectively to the column swash plate and the lower rotor swash plate control means whereby the vertical distance between said column swash plate and said universally mounted lower rotor swash plate control means may be controlled and varied.

8. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with said rotors adapted to vary the pitch of the blades of each rotor; two members slidably mounted on the fixed column and linked together for controlled movement relative to each other, one being disposed above the other; a member universally mounted on the upper slidable member; non-rotating means pivotally mounted on the lower slidable member; and means connecting said universally mounted and said pivotally mounted means to the rotating pitch varying means whereby any changes in the elevation and inclination of the universally mounted member and pivotally mounted means will effectively be imparted to the rotating pitch varying means.

9. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with said rotors adapted to vary the pitch of the blades of each rotor; two members slidably mounted on the fixed column and linked together for controlled movement relative to each other, one being disposed above the other; a member universally mounted on the upper slidable member; non-rotating means pivotally mounted on the lower slidable member; and parallel linkage means connecting said universally mounted member and said pivotally mounted means to the rotating pitch varying means whereby any changes in the elevation and inclination of the universally mounted member and pivotally mounted means will effectively be impaired to the rotating pitch varying means.

10. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; two members slidably mounted on the fixed column and linked together for controlled movement relative to each other, one being disposed above the other; a member universally mounted on the upper slidable member; non-rotating means pivotally mounted on the lower slidable member; means rotating with the upper rotor to vary the pitch of its blades; means rotating with the lower rotor to vary the pitch of its blades; a ring rotatably mounted on the upper rotor blade pitch varying means; a ring rotatably mounted on the universally mounted member; parallel linkages rotating with the lower rotor and connecting the two aforementioned rings whereby any changes in the elevation and inclination of the universally mounted member will effectively be imparted to the upper rotor blade pitch varying means; a ring rotatably mounted on the lower rotor blade pitch varying rotating means; and parallel linkages connecting the last-mentioned ring and the pivotally mounted means whereby any changes in the elevation and inclination of the pivotally mounted means will effectively be imparted to the lower rotor blade pitch varying means.

11. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with said rotors and respectively adapted to vary the pitch of the blades of each rotor; upper middle and lower members slidably mounted on the fixed column and linked together for controlled movement relative to one another; a member universally mounted on the upper slidable member; non-rotating means pivotally mounted on the lower slidable member; and means connecting said universally mounted member and said pivotally mounted means to the rotating pitch varying means whereby any changes in the elevation and inclination of the universally mounted member and pivotally mounted means will effectively be imparted to the rotating pitch varying means.

12. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column; rack and pinion means joining the upper and lower slidable members to the middle slidable member and adapted to vary the distance therebetween; a member universally mounted on the upper slidable member; non-rotating means pivotally mounted on the lower slidable member; and means connecting said universally mounted member and said pivotally mounted means to the rotating pitch varying means whereby any changes in the elevation and inclination of the universally mounted member and pivotally mounted means will effectively be imparted to the rotating pitch varying means.

13. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column; a pinion rotatably mounted on the middle slidable member; a control system to rotate said pinion; vertical racks attached respectively to the upper and to the lower slidable members and engaging with the pinion whereby rotation of the pinion by the control system varies the distance of the upper and lower slidable members from the middle slidable member; a member universally mounted on the upper slidable member; non-rotating means pivotally mounted on the lower slidable member; and means connecting said universally mounted member and said pivotally mounted means to the rotating pitch varying means whereby any changes in the elevation and inclination of the universally mounted member and the pivotally mounted means will effectively be imparted to the rotating pitch varying means.

14. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column, said slidable members being linked together for controlled movement relative to one another; a member universally mounted on the upper slidable member; non-rotating means pivotally mounted on the lower slidable member; means connected with said universally mounted member and said pivotally mounted means to the rotating pitch varying means whereby any changes in the elevation and inclination of the universally mounted member and pivotally mounted means will effectively be imparted to the rotating pitch varying means; and means mounted on the middle slidable member engaging with the universally mounted member and pivotally mounted means and adapted to vary the inclination of the universally mounted member and pivotally mounted means.

15. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column; rack and pinion means joining the upper and lower slidable members to the middle slidable member and adapted to vary the distance therebetween; a member universally mounted on the upper slidable member; non-rotating means pivotally mounted on the lower slidable member; means connecting said universally mounted member and said pivotally mounted means to the rotating pitch varying means whereby any changes in the elevation and inclination of the universally mounted member and pivotally mounted means will effectively be imparted to the rotating pitch varying means; and means mounted on the middle slidable member engaging with the universally mounted member and pivotally mounted means and adapted to vary the inclination of the universally mounted member and pivotally mounted means.

16. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column said slidable members being linked together for controlled movement relative to one another; a member universally mounted on the upper slidable member and having two moment arms radially spaced by 90° with respect to the fixed column; non-rotating means pivotally mounted on the lower slidable member and having two moment arms radially spaced by 90° with respect to the fixed column; means connecting said universally mounted member and said pivotally mounted means to the rotating pitch varying means whereby any changes in the elevation and inclination of the universally mounted member and pivotally mounted means will effectively be imparted to the rotating pitch varying means; and two rack and pinion systems radially spaced by 90° with respect to the fixed column and mounted on the middle slidable member, each system including a pinion and two horizontally travelling racks co-acting with diametrically opposite sides of the pinion and engaging respectively with a moment arm of the universally mounted member and a moment arm of the pivotally mounted means, rotation of the pinions varying the inclination of the universally mounted member and pivotally mounted means.

17. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column; a pinion rotatably mounted on the middle slidable member; vertical racks attached respectively to the upper and to the lower slidable members and engaging with the pinion whereby rotation of the pinion by the control system varies the distance of the upper and lower slidable members from the middle slidable member; a member universally mounted on the upper slidable member and having two moment arms radially spaced by 90° with respect to the fixed column; non-rotating means pivotally mounted on the lower slidable member and having two moment arms radially spaced by 90° with respect to the fixed column; means connecting said universally mounted member and said pivotally mounted means to the rotating pitch varying means whereby any changes in the elevation and inclination of the universally mounted member and pivotally mounted means will effectively be imparted to the rotating pitch varying means; two rack and pinion systems radially spaced by 90° with respect to the fixed column and mounted on the middle slidable member, each system including a pinion and two horizontally travelling racks co-acting with diametrically opposite sides of the pinion and engaging respectively with a moment arm of the universally mounted member and a moment arm of the pivotally mounted means, rotation of the pinions of the systems varying the inclination of the universally mounted member and pivotally mounted means; and control means to individually actuate each of the three pinions.

18. In propelling apparatus for aircraft, a pair of horizontally disposed rotors mounted one above the other, each being provided with a plurality of radially disposed variable pitch blades, said rotors being adapted to revolve in opposite directions for imparting movement to the aircraft; a fixed column; co-axial shafts passing through said fixed column and on which the rotors are respectively mounted; means rotating with the rotors to vary the pitch of the blades of each rotor; upper, middle and lower members slidably mounted on the fixed column; said slidable members being linked together for controlled movement relative to one another; a member universally mounted on the upper slidable member and having two moment arms radially spaced by 90° with respect to the fixed column; non-rotating means pivotally mounted on the lower slidable member and having two moment arms radially spaced by 90° with respect to the fixed column; means connecting said universally mounted member and said pivotally mounted means to the rotating pitch varying means whereby any changes in the elevation and inclination of the universally mounted member and pivotally mounted means will effectively be imparted to the rotating pitch varying means; two systems radially spaced by 90° with respect to the fixed column, and mounted on the middle slidable member, each system including a horizontally reciprocable crosshead having a member which engages with a moment arm of the universally mounted member and a member which engages with a moment arm of the pivotally mounted means; and means to reciprocate the crosshead to vary the inclination of the universally mounted member and pivotally mounted means.

STANLEY JAMES BURWELL.

REFERENCES CITED

The following references are of record in the file of this patent:

UNITED STATES PATENTS

| Number | Name | Date |
|---|---|---|
| 1,345,101 | Perry | June 29, 1920 |
| 1,836,406 | Smith | Dec. 15, 1931 |
| 1,919,089 | Breguet | July 18, 1933 |
| 1,921,805 | Bordoni | Aug. 8, 1933 |
| 1,940,108 | Sweet | Dec. 19, 1933 |
| 2,256,635 | Young | Sept. 23, 1941 |
| 2,271,473 | Bennett | Jan. 27, 1942 |
| 2,394,846 | Cox | Feb. 12, 1946 |
| 2,481,745 | Hiller | Sept. 13, 1949 |

FOREIGN PATENTS

| Number | Country | Date |
|---|---|---|
| 878,912 | France | Nov. 2, 1942 |